Jan. 8, 1935.  A. N. CRAMER  1,986,917
MACHINE FOR FORMING GLASS LENS BLANKS
Filed Sept. 28, 1931   2 Sheets-Sheet 1
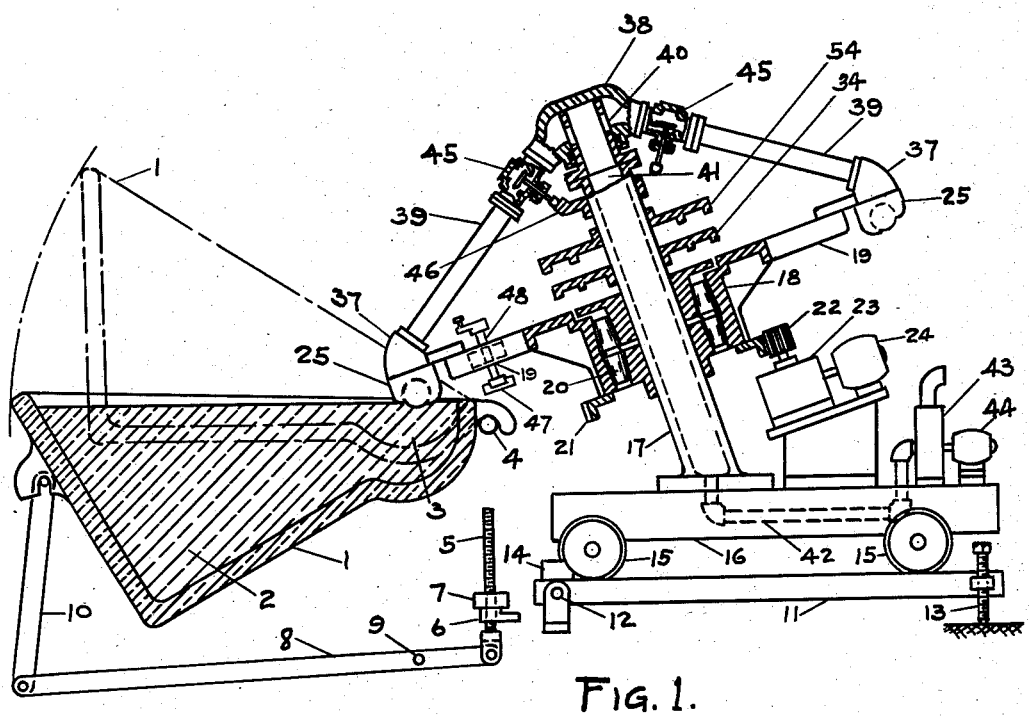
FIG. 1.
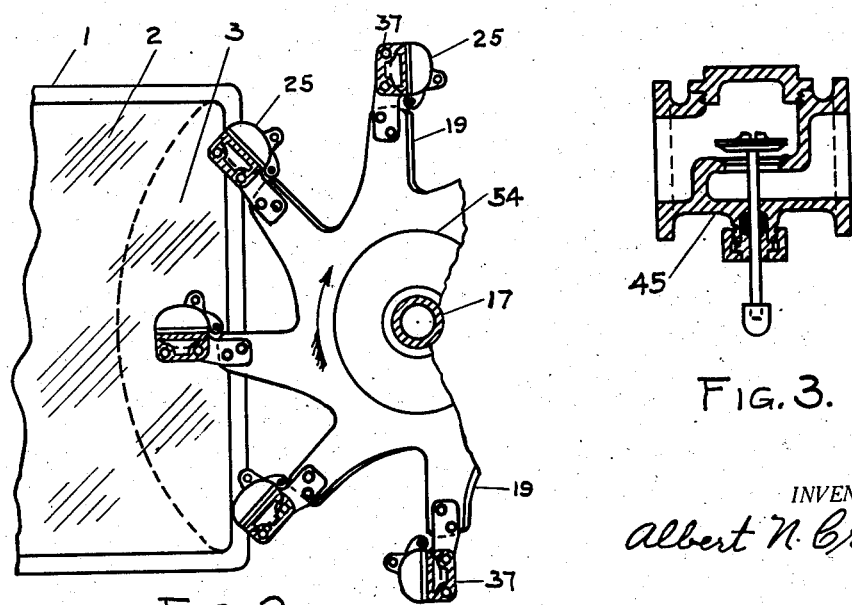
FIG. 2.
FIG. 3.
INVENTOR.
Albert N. Cramer, Jan. 8, 1935. A. N. CRAMER 1,986,917
MACHINE FOR FORMING GLASS LENS BLANKS
Filed Sept. 28, 1931 2 Sheets-Sheet 2

INVENTOR.
Albert N. Cramer

Patented Jan. 8, 1935

1,986,917

UNITED STATES PATENT OFFICE 1,986,917

MACHINE FOR FORMING GLASS LENS BLANKS

Albert N. Cramer, Toledo, Ohio, assignor, by mesne assignments, to Owens-Illinois Glass Company, Toledo, Ohio, a corporation of Ohio Application September 28, 1931, Serial No. 565,567

3 Claims. (Cl. 49—5)

The present invention relates to improvements in machines for forming lens blanks, such as are used particularly for manufacture of glass spectacle lenses. It relates particularly to forming the molten glass into suitable shapes from which the finished lenses may be ground.

It is customary to roll the molten glass into flat sheets, and each sheet, when cooled, is subdivided by cutting into square portions of suitable size to form the lens blank. Such cutting is usually done by scratching the surface of the sheet and breaking through such scratch, which produces rough fractured edges. These square portions are sorted by weight and re-heated to proper plasticity to mold into round forms with curved surfaces, from which the finished lenses are ground. The re-heating operation is always difficult and precarious. Some glasses are very sensitive to the furnace atmosphere, and great caution must be exercised that a definite atmosphere is maintained. Other glasses invariably change color in the re-heating process, and a slight variation of temperature will vary the resultant color of such glasses. Many finished lenses are defective because the rough edges do not fuse during the re-heating and molding operations. Furthermore, the difficulty of accurately weighing each lens forming portion results in lens blanks of various thicknesses, which seriously complicates the grinding operation, particularly when it is done in groups.

It has been attempted to make spectacle lens blanks by using a gob feeder for subdividing the molten glass and then pressing a multiple of lens blanks from each gob, in a manner similar to the usual gob fed pressing operation. The result has been unsatisfactory because striae has developed which makes the lens blanks unfit for spectacle lenses. It is characteristic of the vacuum process that the minimum amount of striae is developed when the molten glass is subdivided, and what striae may develop will be in the direction of the flow of the molten glass into the mold. Such striae would be parallel to the surface of the lens blanks and therefore would not be objectionable in spectacle lens blanks.

One object of the present invention is to provide lens blanks with the minimum amount of striae and to control any striae that may develop so that it is parallel to the surfaces of the finished lenses.

An object of the present invention relates to forming lens blanks directly from the molten glass and similar in shape to the finished lenses.

Another object is to provide lens blanks formed directly from molten glass and devoid of rough cut edges.

Another object is to provide lens blanks of uniform thicknesses, which have been divided directly from the molten glass.

Another object is to provide curved surfaced lens blanks, which have been formed directly from the molten glass.

A further object is to provide lens blanks of predetermined weight, which have been formed directly from the molten glass.

Still another object is to provide means for forming lens blanks from a mass of molten glass by molds rotating in a single plane and in contact with said molten glass.

Still another object is to provide a receptacle for molten glass in which the glass level is maintained to contact with a rotating series of molds while the mass of molten glass is being reduced.

Other objects will be apparent hereinafter.

The present application discloses certain subject-matter shown and claimed in my copending application Serial No. 572,081, filed October 30, 1931.

In the accompanying drawings:

Figure 1 is a sectional view in elevation of the proposed mechanism.

Figure 2 is a fragmentary plan view of the mechanism shown in Figure 1, and illustrates particularly the relation of the rotating series of molds to the container for the molten glass.

Figure 3 is a sectional view showing in detail the valve 45.

Figure 4:
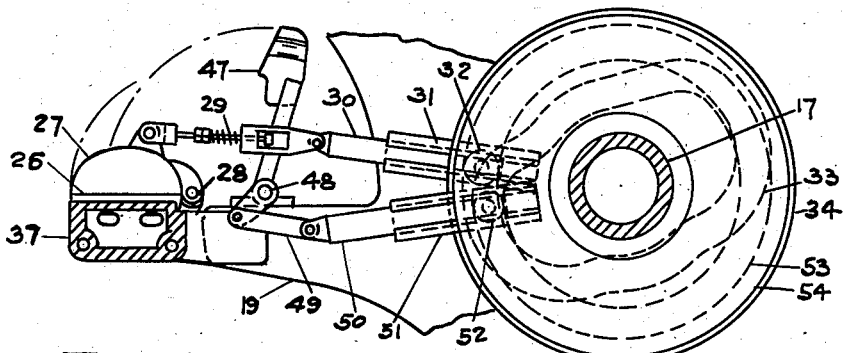
Figure 4 is a fragmentary plan view showing the mechanism for operating the cutting knife and the mechanism for opening and closing the mold sections.
Figures 5, 7, 8:
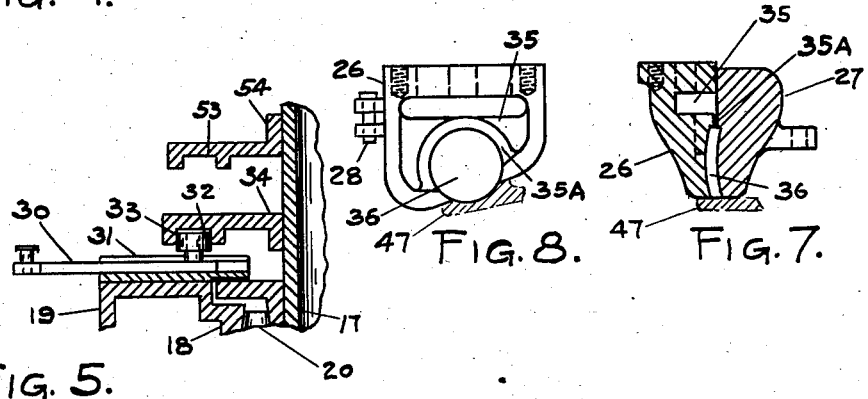
Figure 5 is a fragmentary sectional elevation of the cam and slide for opening and closing the mold sections.
Figure 7 is a detail view in cross-section of the mold parts, showing particularly the mold cavity and the vacuum passages thereto.
Figure 8 is a detail view in elevation of the rigidly secured mold section and shows particularly the vacuum passages therein.
Figure 6:
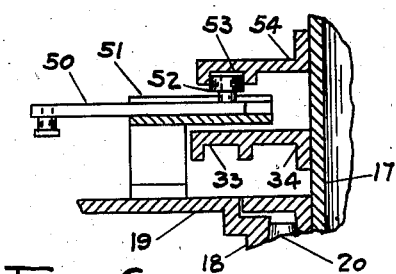
Figure 6 is a fragmentary sectional elevation of the cam and slide for operating the cutting knife.

In the accompanying drawings is shown a pot 1 for molten glass 2 which is heated, in a manner not shown, to maintain any desired temperature. As shown in Figure 1, said pot is provided with a gathering portion 3 and adjacent thereto a pivot 4. Threaded member 5 is provided with a nut 6 co-acting with the stop 7, and is connected to the lever 8, which is fulcrumed at 9, and which supports the rear end of the pot by means of the link 10. Adjustment of the nut 6 is adapted to tilt the pot and thereby maintain the level of the molten glass in the gathering portion thereof.

A rotating lens blank forming machine is movably positioned adjacent said pot. To support the forming machine there is provided a track structure 11, pivoted at one end 12, and supported at the other end by the adjusting screw 13. Adjustment of this screw regulates the incline of the track structure, and thereby controls the plane in which the molds travel. Attached to the track structure is a stop 14 adapted to position the forming machine in relation to the pot by co-acting with the wheel 15, upon which the base 16 of said forming machine is mounted. Superimposed upon this base is an annular column 17 about which the moving parts rotate. The moving parts comprise an annular hub 18, with a series of projecting arms 19, at the ends of which are located glass forming molds 25. Suitable anti-friction bearings 20 are mounted on the column about which the hub rotates. Mounted on said hub is an annular toothed gear 21, in co-acting relation with pinion 22, mounted upon said base and actuated through a suitable speed reduction unit 23, by a motor 24, or other suitable source of power.

The glass forming mold parts 25 comprise two mold sections. One section 26 is rigidly secured to the arm 19, whereas the other section 27 is pivotally mounted at 28 upon the rigidly mounted section. To move the two sections into and out of co-acting relation, there is provided a suitable resilient link 29, which connects the pivoted section to the slide 30, which is movable in the guide 31, by the roller 32, which is controlled by the cam-path 33 of the actuating cam 34. The mold sections are held in closed contact while being filled with the molten glass, and until the glass has cooled sufficiently to form the lens blank. At a predetermined station the cam 34 opens the mold sections, and the lens blank drops into a suitable receptacle or conveyor, not shown, for handling the blanks to the annealing process.

The rigidly mounted section 26, of the mold parts 25, is provided with a relatively large passage 35 in spaced relation to the mold cavity 36. A relatively narrow passage 35A connects the larger passage with the mold cavity when the mold sections are in closed contact. This narrow passage is sufficiently wide to permit the atmosphere to be exhausted from the mold cavity, and is sufficiently narrow that the molten glass is excluded therefrom.

Superimposed over the rigidly mounted mold section is an exhaust chamber 37, which is rigidly secured to the arm 19, and connects the large passages 35 with the rotatable portion 38 of a distributing chamber by means of the hollow tubular member 39. The non-rotating portion 40 of this chamber is secured to the column 17, and connected by means of the hollow passage 41 therethrough and piping 42 to an exhausting device 43, which is adapted to exhaust atmospheric pressure from said passages. This exhausting device is preferably mounted on the base 16, and is actuated by a suitable source of power, preferably a motor 44.

Interposed in the hollow tubular member 39 is a valve mechanism 45, shown in detail in Figure 3, for opening and closing the hollow passage. This valve is normally closed by the exhausted atmosphere of the distributing head. A cam 46, mounted on the column 17, is adapted to open said valve and thus exhaust the atmosphere from the glass forming mold, while the open bottom of the mold is in contact with the molten glass.

A cut-off knife 47, shaped to conform to the mold bottom, is provided for each mold. This knife is mounted at 48, on the arm 19, to insure proper cutting contact with the fixed mold section 26. Knife operating mechanism is provided by the link 49 attached to the slide 50, which is slidable in the guide 51, and actuated by the attached roller 52, mounted in the cam path 53 of the cam 54. Normally the knife is held out of the path travelled by the mold, to insure non-contact with the mass of molten glass in the pot 1. When the mold bottom contacts with the molten glass in the pot 1, it is submerged sufficiently to close the opening therein from the external atmosphere. The previously described valve 45 is now opened and the atmosphere is exhausted from the mold cavity 36, through the narrow passages 35A, and is replaced by the molten glass from the pot, which is forced into the exhausted cavity by the external atmospheric pressure exerted upon the mass of molten glass. The narrow passages 35A confine the molten glass to the mold cavity. As the mold emerges from the mass of molten glass, the cut-off knife 47 is actuated by the previously described cam 54, and that portion of the glass which is exterior to the mold cavity is cut off and falls into the pot 1. It is noteworthy that the cut-off knife is moved towards the rigidly mounted section of the mold, as a clean cut is thereby assured.

Modifications may be resorted to within the scope and spirit of this invention.

What I claim is:

1. In glass forming machines, a container with molten glass therein, means for tilting said container to maintain the surface of said molten glass at a constant level, and molds rotating in a plane inclined to and adapted to contact with the surface of said molten glass.

2. In a machine for forming glass lens blanks, a container with a mass of molten glass therein, means for adjustably tilting said container, an inclined column, a rotating series of molds adapted to rotate about said column and successively contact with the surface of said molten glass, means for successively filling said molds with said molten glass, means for removing adhering portions of glass from the exterior of said molds as they successively break contact with said molten glass, and means for discharging the glass from successive molds at a predetermined position.

3. Glass forming apparatus comprising, in combination, a tiltable container for a pool of molten glass, molds open at their bottoms, means for moving the molds in a path such that the mold bottoms travel in a plane inclined to the horizontal and to said pool, and are brought by said travel into sealing contact with the glass in the pool, means for filling the molds with glass from the pool while in said sealing contact, and means for severing the glass in the molds from the molten glass in the container.

ALBERT N. CRAMER.